Feb. 28, 1950     S. L. EVANS     2,498,946
CATTLE SPRAYER
Filed Sept. 10, 1945     2 Sheets-Sheet 1
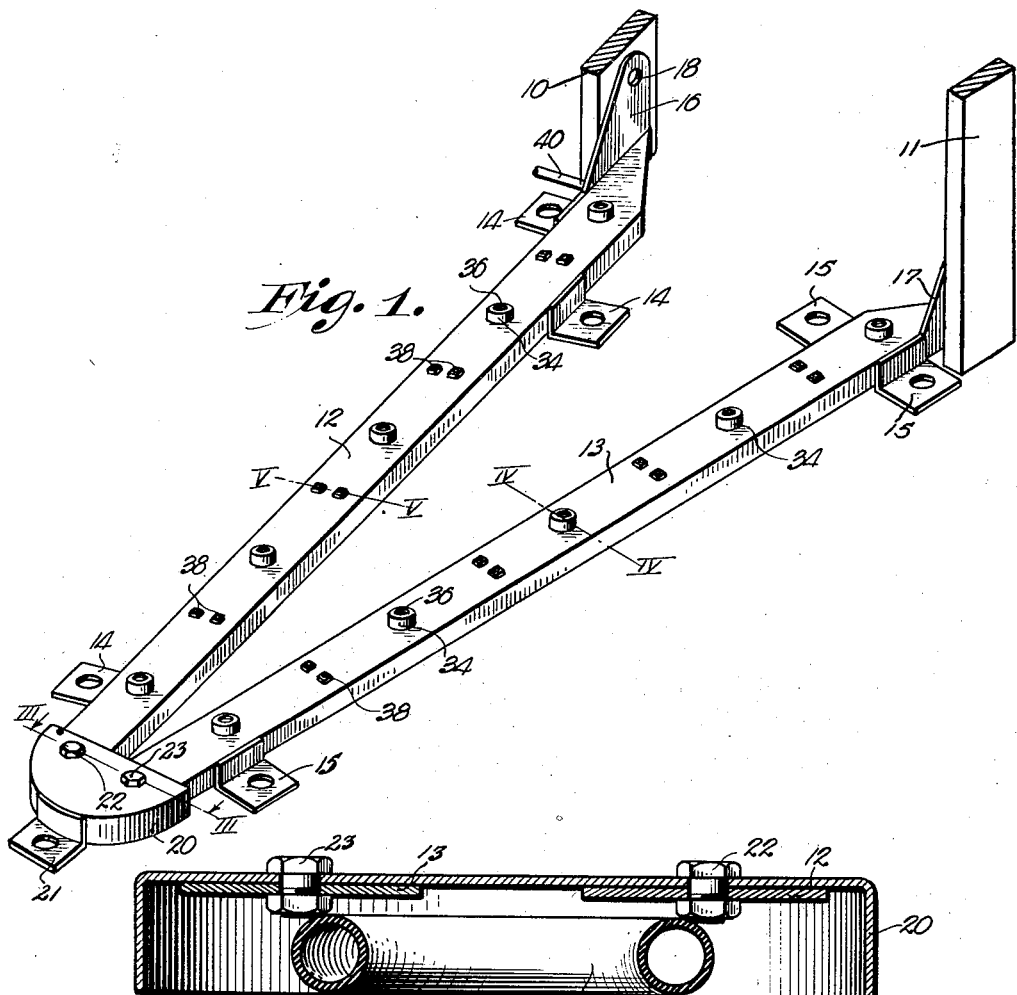
Fig. 1.
Fig. 3.
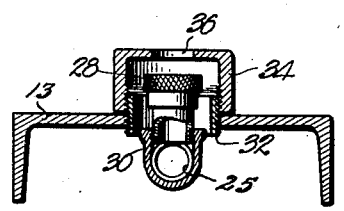
Fig. 4.
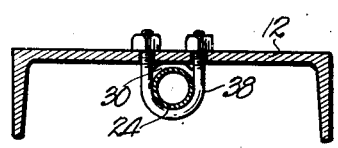
Fig. 5.
INVENTOR.
Sterling L. Evans
BY
ATTORNEY.

Feb. 28, 1950 S. L. EVANS 2,498,946
CATTLE SPRAYER
Filed Sept. 10, 1945 2 Sheets-Sheet 2

INVENTOR.
Sterling L. Evans
BY
ATTORNEY.

Patented Feb. 28, 1950

2,498,946

UNITED STATES PATENT OFFICE 2,498,946

CATTLE SPRAYER

Sterling L. Evans, Kansas City, Mo.

Application September 10, 1945, Serial No. 615,291

4 Claims. (Cl. 119—159)

This invention relates to spraying apparatus of the character employed in applying liquid substances to cattle as the same move along a path of travel and has for its primary aim to provide such equipment that is particularly useful in directing an insecticide upwardly against the under sides of animals as they are driven over the top of the structure embodying the invention.

One of the more important objects of the invention is to provide a cattle sprayer of the type capable of disposition near a gate through which cattle are driven and by means of which the insecticide to be applied is upwardly directed from a series of specially disposed nozzles arranged in a V-shaped pattern whereby upon movement of the cattle along the path of travel and over the sprayer, the insecticide becomes more concentrated and the entire under parts of the animal are coated and effectively reached.

This invention has for another object to provide a cattle sprayer of the aforementioned type comprising a V-shaped body along the length of each leg whereof is disposed a series of adjustable nozzles, said nozzles being protected against destructive forces by the hoofs of the animals passing thereover.

Other aims of the invention include the provision of an adjustable body for a cattle sprayer, which body is substantially V-shaped and capable of having the angularity between the stretches of the body altered to suit conditions; the provision of suitable anchoring means at the free ends of the stretches of the body whereby the sprayer may be operably secured in place at a gate; the provision of unique means for supplying an insecticide to all of the nozzles, which means need not be disassociated from the body as the aforesaid adjustment occurs and to provide novel structural elements for embodying the many objects of the invention.

Additional objects of the invention, as well as the manner of utilizing and constructing a cattle sprayer will appear during the course of the following specification referring to the accompanying drawings, wherein:

Fig. 1 is a perspective view of a cattle sprayer made in accordance with the present invention.

Fig. 3 is an enlarged detailed cross sectional view taken on line III—III of Fig. 1.

Fig. 4 is a similar cross sectional view taken on line IV—IV of Fig. 1, and

Fig. 5 is a detailed cross sectional view taken on line V—V of Fig. 1.

Figure 2:
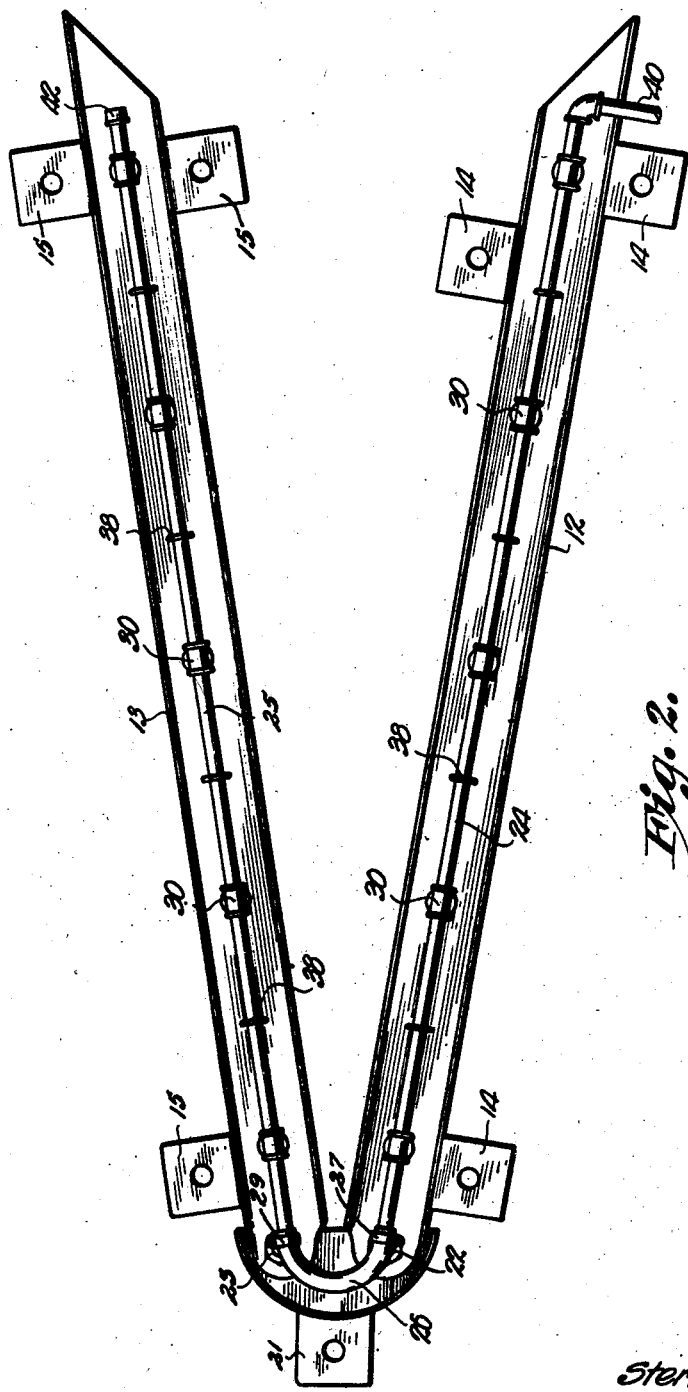
Fig. 2 is an inverted plan view of the same.

It has heretofore been difficult to effectively apply insecticides and other liquid cattle treating materials to the under sides of cattle, particularly where the same have been on the range for an appreciable length of time and hand sprays cannot be safely and adequately employed.

It is the principal aim of this invention to provide a sprayer through the use of which the under sides of cattle may be sprayed as the animals pass along a path of travel and particularly through a gate adjacent to which the sprayer is disposed. In actual practice the sprayer is placed upon the ground to extend outwardly from spaced apart gate posts 10 and 11 between which the cattle are driven and thereby caused to pass over the body of the sprayer, which body is V-shaped in form and comprises a pair of legs 12 and 13, each channel shaped in form with their open sides downwardly faced. These legs 12 and 13 have lateral feet 14 and 15, respectively thereon that provide a bearing surface to prevent the edges of the channel walls from cutting into the earth. The free ends of legs 12 and 13 have means for attachment to the respective gate posts 10 and 11; such means is preferably in the nature of brackets 16 and 17, bracket 16 having an opening 18 and bracket 17 having a similar opening (not shown) through which may be passed adequate instrumentalities such as nails or screws. The apex of the V-shaped body is provided with a head 20 having a foot 21 thereon and serving as means for interconnecting the ends of channels 12 and 13. This head 20 is hollow and receives the ends of legs 12 as shown in Fig. 3. The received ends and head 20 have bolts 22 and 23 extending therethrough about the axes whereof legs 12 and 13 may be swung when it is desired to widen the body or when it is necessary to adjust the legs to fit between gate posts 10 and 11, bolts 22 and 23 serving, therefore, as the means of mounting the ends of legs 12 and 13 in head 20.

Each leg 12 and 13 has a stretch of pipe 24 and 25 respectively extending longitudinally therealong and at the ends of pipe adjacent to head 20 there is provided a flexible connection 26 having clamps 27 and 29 through the medium whereof pipes 24 and 25 are joined, all to the end that adjustment of legs 12 and 13 may occur without effecting the function of pipes 24 and 25 and their ability to convey liquid therethrough and to each and all of the several spray heads 28 that are located at spaced apart points along the lengths of each pipe 24 and 25. These spray heads are operably secured to pipes 24 and 25 through the medium of conventional connections such as a pipe T 30 and because of the use of pipe T's, spray heads 28 may be adjusted circumferentially with respect to pipes 24 and 25 and the legs 12 and 13. Sleeves 32 are mounted in openings formed through the upper wall of each channel-shaped leg 12 and 13 to receive spray heads 28 and these sleeves are externally threaded to in turn support a cap 34 perforated as at 36 to allow spray heads 28 to direct streams of liquid upwardly therethrough. These caps 34 are rugged and heavy and serve to protect spray heads 28 against the hoofs of the animals that move over the top of the body of the sprayer. Pipes 24 and 25 are held in place against the under side of channels 12 and 13 by U-bolts or the like 38 and when the parts are so assembled, no amount of hard use or pounding by the hoofs of animals will affect the operation of the equipment. It is noticeable that feet 14, 15 and 21 have openings therein through which stakes or other anchoring means may be driven into the ground for the purpose of preventing displacement of the body as it is in use. One end of pipe 24 is joined to a source of supply of liquid insecticide by a conduit 40 and any suitable valve may be disposed in this said conduit 40 for the purpose of periodically starting or stopping the flow of liquid to the several spray nozzles 28. Obviously one end of pipe 25 is capped as at 42 and when the liquid is supplied through conduit 40, it flows through the adjacent pipe 24, flexible connection 26 and the pipe 25. In practice, a sufficient amount of pressure is maintained to keep perforations 36 clear of any dirt or dust that might drop thereinto and said perforations 36 are so small that the hoofs of animals will not project therethrough to damage the more delicate spray head 28 protected by caps 34. As the animals pass between posts 10 and 11, a valve (not here shown) in conduit 40 is opened and an insecticide spray is directed upwardly on each side of the animal, the spray converging at a point ahead of the posts 10 and 11. Such arrangement of spray heads 28 will insure thoroughly coating the under side of the animal without waste of expensive chemicals and with the assurance that complete application has been made.

It is notable that through use of the pipe T's 30 as a means for connecting the number of pipe sections 24 and 25 and as a mounting for spray heads 28, the jets of liquid may be directed upwardly at selected angles. This is accomplished by turning the T's 30 on the pipe sections 24 and 25, which in turn shifts the heads 28 to and from positions where the liquid is concentrated above the body formed by legs 12 and 13. Obviously, cattle sprayers having physical characteristics different from those shown and described may be produced without departing from the spirit of the invention and scope of the appended claims.

Having thus described my invention what I claim as new and desire to secure by Letters Patent is:

1. A sprayer of the character described comprising a V-shaped body having a pair of legs articulated at the apex of the body; a plurality of spray heads along the legs of the body; a pipe mounted on each leg respectively for supplying liquid under pressure to the spray heads, and means for connecting the pipes at the apex of the body, said means being flexible to permit relative movement of the legs and the pipes carried thereby toward and from each other.

2. A sprayer of the character described comprising a V-shaped body having a pair of legs articulated at the apex of the body to permit relative movement of the legs toward and from each other; a plurality of spray heads along the legs of the body; and a pipe for supplying liquid under pressure to the spray heads, said spray heads being mounted on the pipe, said body having a guard thereon for each of the said spray heads.

3. A sprayer of the character described comprising a V-shaped body having a pair of legs articulated at the apex of the body to permit relative movement of the legs toward and from each other; a plurality of spray heads along the legs of the body; and a pipe for supplying liquid under pressure to the spray heads, said spray heads being mounted on the pipe, said body having a guard thereon for each of the said spray heads, said spray heads being shiftable laterally of the legs to direct jets of liquid upwardly at angles to obtain desired concentration of the liquid above the said V-shaped body.

4. A sprayer of the character described comprising a pair of perforated channels adapted to be arranged in side-by-side relation; a head, one end of each channel respectively having pivotal connection with said head, permitting spreading of the opposite ends of the channels to form a V-shaped body adapted for placement in the path of travel of the cattle being sprayed; a pipe in each channel respectively extending longitudinally thereof; spray heads on the pipes and located to direct their jets through the perforations of the channels; and a flexible connection between the said pipes beneath the head.

STERLING L. EVANS.

REFERENCES CITED

The following references are of record in the file of this patent:

UNITED STATES PATENTS

| Number | Name | Date |
|---|---|---|
| 883,132 | Goff | Mar. 24, 1908 |
| 1,006,210 | Heid | Oct. 17, 1911 |
| 1,730,348 | Anstiss | Oct. 8, 1929 |
| 2,347,739 | Higgins | May 2, 1944 |
| 2,264,201 | Findlay | Nov. 25, 1941 |